US012482593B2

(12) United States Patent
Nagai et al.

(10) Patent No.: US 12,482,593 B2
(45) Date of Patent: Nov. 25, 2025

(54) LAMINATED COIL COMPONENT

(71) Applicant: TDK CORPORATION, Tokyo (JP)

(72) Inventors: Yusuke Nagai, Tokyo (JP); Hidekazu Sato, Tokyo (JP); Kunihiko Kawasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 996 days.

(21) Appl. No.: 17/570,002

(22) Filed: Jan. 6, 2022

(65) Prior Publication Data

US 2022/0262558 A1 Aug. 18, 2022

(30) Foreign Application Priority Data

Feb. 18, 2021 (JP) ................................ 2021-024002

(51) Int. Cl.
*H01F 27/28* (2006.01)

(52) U.S. Cl.
CPC . *H01F 27/2804* (2013.01); *H01F 2027/2809* (2013.01)

(58) Field of Classification Search
CPC ......... H01F 27/2804; H01F 2027/2809; H01F 17/04; H01F 27/292; H01F 17/0013; H01F 27/28; H01F 27/303
USPC ............................ 336/65, 83, 200, 232–234
See application file for complete search history.

(56) References Cited

U.S. PATENT DOCUMENTS

| | | | | |
|---|---|---|---|---|
| 5,610,433 | A * | 3/1997 | Merrill | H01F 17/0013 336/200 |
| 2017/0025219 | A1* | 1/2017 | Nagai | H01F 17/0013 |
| 2017/0053727 | A1 | 2/2017 | Eshima et al. | |
| 2017/0287621 | A1 | 10/2017 | Seino et al. | |

FOREIGN PATENT DOCUMENTS

| | | | | |
|---|---|---|---|---|
| JP | 2000-216023 A | 8/2000 | | |
| JP | 2017-028143 A | 2/2017 | | |
| JP | 2017-183663 A | 10/2017 | | |
| WO | 2015/174124 A1 | 11/2015 | | |
| WO | WO-2017110952 A1 * | 6/2017 | | H01F 27/24 |

* cited by examiner

*Primary Examiner* — Tuyen T Nguyen
(74) *Attorney, Agent, or Firm* — Oliff PLC

(57) ABSTRACT

A laminated coil component capable of improving winding efficiency and characteristics and realizing a simple configuration and an improved withstand voltage is provided. A laminated coil component includes a coil portion formed inside an insulating element body forming a laminated structure and in a first conductor pattern layer and a second conductor pattern layer constituting the coil portion, positions of a pair of end portions of an outer conductor line and a pair of end portions of an inner conductor line facing each other with a division region interposed therebetween are displaced in a line direction of the coil portion passing through the division region.

8 Claims, 11 Drawing Sheets

LAMINATED COIL COMPONENT

TECHNICAL FIELD

The present disclosure relates to a laminated coil component.

BACKGROUND

In recent years, there is a demand for miniaturization and improvement of characteristics of laminated coil components mounted on electronic components with the demand for miniaturization and high performance of electronic components. For example, a laminated inductor described in Japanese Patent Application Laid-Open No. 2000-216023 includes a coil having a so-called multiple wound structure. In the conventional laminated inductor, for example, an outer coil of each layer is wound from one side toward the other side in a laminating direction and an inner coil of each layer is wound from the other side toward one side in the laminating direction.

SUMMARY

In the above-described laminated coil component, there are further technical problems such as simplification of configuration and improvement of a withstand voltage in addition to the miniaturization and the improvement of characteristics. For example, in the above-described laminated inductor of Japanese Patent Application Laid-Open No. 2000-216023, since the number of types of required conductor patterns increases although the winding efficiency is improved by forming the coil of the multiple wound structure, it is considered that it takes time and effort to produce each layer.

The present disclosure has been made to solve the above-described problems and an object thereof is to provide a laminated coil component capable of improving winding efficiency and characteristics and realizing a simple configuration and an improved withstand voltage.

A laminated coil component according to an aspect of the present disclosure is a laminated coil component including a coil portion formed inside an insulating element body forming a laminated structure, wherein the coil portion includes a first conductor pattern layer having annular outer and inner conductor lines partially divided in a predetermined division region, a second conductor pattern layer having an outer connection line connecting the outer conductor lines of the first conductor pattern layers adjacent to each other in a laminating direction in the division region and an inner connection line connecting the inner conductor lines of the first conductor pattern layers adjacent to each other in the laminating direction in the division region, and a third conductor pattern layer having a connection line connecting the outer conductor line and the inner conductor line, and wherein positions of a pair of end portions of the outer conductor line and a pair of end portions of the inner conductor line facing each other with the division region interposed therebetween or positions of both end portions of the outer connection line and both end portions of the inner conductor line in the division region are displaced in a line direction of the coil portion passing through the division region.

In the laminated coil component, the outer conductor lines and the inner conductor lines of the first conductor pattern layers adjacent to each other in the laminating direction are connected to each other so that the coil portion of a multiple wound structure is formed inside the element body. By adopting the coil portion having such a multiple wound structure, the winding efficiency can be improved. In the laminated coil component, the outer conductor lines and the inner conductor lines are connected in a stepped manner by the outer connection line and the inner connection line located at the division region of the outer conductor line and the inner conductor line. Therefore, since it is possible to sufficiently ensure the inner diameter of the coil portion, it is possible to improve the characteristics such as the inductance value, the DC superimposition characteristic, and the DC resistance. Further, it is possible to reduce the types of conductor patterns required for forming the coil portion and it is possible to avoid taking time and effort to produce each layer.

Further, in the laminated coil component, the positions of the pair of end portions of the outer conductor line and the pair of end portions of the inner conductor line facing each other with the division region interposed therebetween or the positions of both end portions of the outer connection line and both end portions of the inner connection line in the division region are displaced in the line direction of the coil portion passing through the division region. Accordingly, it is possible to suppress the length of the region in which the outer conductor line and the inner conductor line are parallel to each other. The region in which the outer conductor line and the inner conductor line are parallel to each other is more likely to receive a voltage than other parts. Thus, it is possible to improve the withstand voltage by suppressing the length of the region.

Positions of both end portions of the outer connection line and both end portions of the inner connection line in the division region may be aligned with respect to a line direction of the coil portion passing through the division region, and positions of a pair of end portions of the outer conductor line and a pair of end portions of the inner conductor line facing each other with the division region interposed therebetween may be displaced in a line direction of the coil portion passing through the division region. According to this configuration, it is possible to more reliably suppress the length of the region in which the outer line and the inner line are parallel to each other. Thus, it is possible to further appropriately improve the withstand voltage.

In the first conductor pattern layer, a resistivity of a region between the outer conductor line and the inner conductor line may be higher than a resistivity of a center region of the first conductor pattern layer. The region between the outer conductor line and the inner conductor line is more likely to receive a voltage than other parts. Thus, it is possible to further improve the withstand voltage by relatively increasing the resistivity of the corresponding region.

In the second conductor pattern layer, a resistivity of a region between the outer conductor lines and the inner conductor lines of the first conductor pattern layers adjacent to each other in the laminating direction may be higher than a resistivity of a center region of the second conductor pattern layer. The region between the outer conductor lines and the inner conductor lines of the first conductor pattern layers adjacent to each other in the laminating direction is more likely to receive a voltage than other parts. Thus, it is possible to further improve the withstand voltage by relatively increasing the resistivity of the corresponding region.

A thickness of the second conductor pattern layer may be smaller than a thickness of the first conductor pattern layer. Accordingly, it is possible to reduce the thickness of the connection portion of the outer conductor line and the inner conductor line and to more closely wind the coil portion in the laminating direction. Further, it is possible to suppress the heat shrinkage of the connection portion and a variation in thickness due to the heat shrinkage by suppressing the thickness of the connection portion. Thus, it is possible to suppress the occurrence of disconnection in the connection portion.

A pair of terminal electrodes may be provided on one end surface of the element body in the laminating direction, and the coil portion may include a fourth conductor pattern layer having a lead conductor connecting the outer conductor line to one of the pair of terminal electrodes and connecting the inner conductor line to the other of the pair of terminal electrodes. In this case, a so-called bottom terminal type laminated coil component can be configured. In the bottom terminal type laminated coil component, the mounting area can be reduced and the high-density mounting can be realized.

The third conductor pattern layer may connect the outer conductor line and the inner conductor line on the other end surface side of the element body in the laminating direction. Accordingly, the number of turns of the coil portion can be sufficiently ensured.

According to the present disclosure, it is possible to improve winding efficiency and characteristics and realize a simple configuration and an improved withstand voltage.

DETAILED DESCRIPTION

Hereinafter, a preferred embodiment of a laminated coil component according to an aspect of the present disclosure will be described in detail with reference to the drawings.

Figure 1:
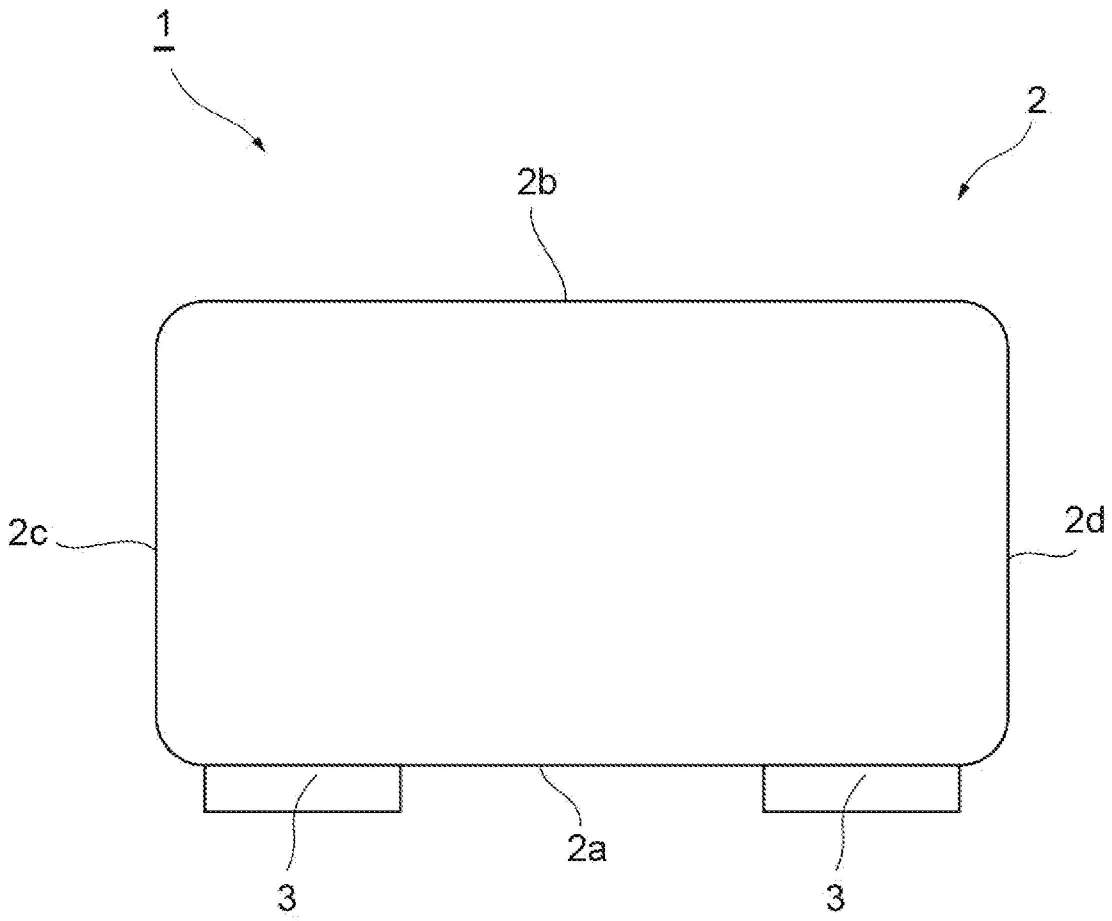
FIG. 1 is a schematic side view showing a laminated coil component according to an embodiment of the present disclosure.

FIG. 1 is a schematic side view showing a laminated coil component according to an embodiment of the present disclosure. A laminated coil component 1 is a component applied to, for example, a bead inductor or a power inductor. The laminated coil component 1 includes, as shown in FIG. 1, a rectangular parallelepiped element body 2 and a pair of terminal electrodes 3 and 3.

The element body 2 includes a pair of end surfaces 2*a* and 2*b* facing each other and a pair of end surfaces 2*c* and 2*d* facing each other in a direction orthogonal to the facing direction of the end surfaces 2*a* and 2*b*. The end surface 2*a* (the bottom surface shown in FIG. 1) is a surface on which the laminated coil component 1 is mounted. The mounting surface is a surface facing another electronic device (circuit board, electronic component, or the like) when the laminated coil component 1 is mounted on another electronic device. The rectangular parallelepiped shape here includes a rectangular parallelepiped shape in which corners and ridges are chamfered and a rectangular parallelepiped in which corners and ridges are rounded.

Figure 3:
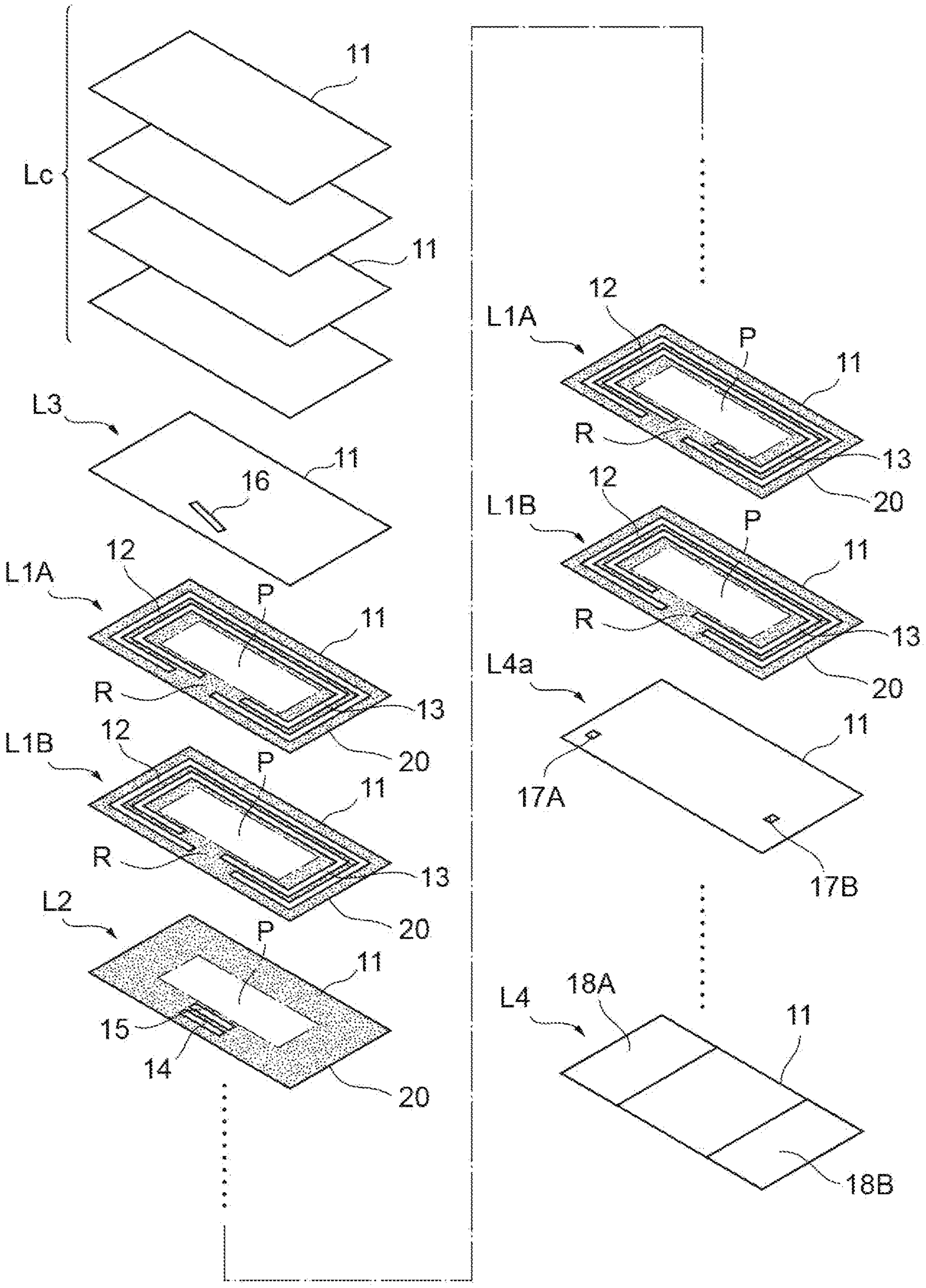
FIG. 3 is a schematic exploded perspective view showing an example of a layer configuration of the laminated coil component shown in FIG. 1.

The element body 2 has a laminated structure consisting of a plurality of magnetic material layers (see FIG. 3). These layers are laminated in the facing direction of the end surfaces 2*a* and 2*b*. That is, the laminating direction of the plurality of layers coincides with the facing direction of the end surfaces 2*a* and 2*b* (hereinafter, the facing direction of the end surfaces 2*a* and 2*b* is referred to as the "laminating direction"). In the actual element body 2, the plurality of layers are integrated to the extent that the boundary between the layers cannot be visually recognized.

The element body 2 is formed of, for example, metal magnetic particles, ferrite, or a glass-ceramic material. In this embodiment, the element body 2 contains a plurality of metal magnetic particles (not shown). The metal magnetic particles are composed of, for example, a soft magnetic alloy. The soft magnetic alloy is, for example, a Fe—Si based alloy or a FeSiCr based alloy. When the soft magnetic alloy is a Fe—Si based alloy, the soft magnetic alloy may contain P. The soft magnetic alloy may be, for example, a Fe—Ni—Si-M based alloy. "M" includes one or more elements selected from Co, Cr, Mn, P, Ti, Zr, Hf, Nb, Ta, Mo, Mg, Ca, Sr, Ba, Zn, B, Al, and rare earth elements.

In the element body 2, the metal magnetic particles are bonded to each other. Bonding between metal magnetic particles is realized, for example, by bonding oxide films formed on the surface of metal magnetic particles. Further, the element body 2 includes a resin-filled portion. The resin exists at least in a part between the plurality of metal magnetic particles. The resin is a resin having electrical insulation. As the resin, for example, silicone resin, phenol resin, acrylic resin, epoxy resin, and the like are used. A void portion that is not filled with the resin may exist between the plurality of metal magnetic particles.

The laminated coil component 1 shown in FIG. 1 is a so-called bottom terminal type. Both the pair of terminal electrodes 3 and 3 are formed in a flat rectangular parallelepiped shape and are arranged to be separated from each other in the facing directions of the end surfaces 2*c* and 2*d* in the end surface 2*a* of the element body 2. The terminal electrode 3 is configured to contain a conductive material. The conductive material is, for example, Ag or Pd. The terminal electrode 3 is, for example, a baking electrode, and is configured as a sintered body of a conductive paste. The conductive paste contains conductive metal powder and glass frit. The conductive metal powder is, for example, Ag powder or Pd powder. A plating layer may be formed on the surface of the terminal electrode 3. The plating layer is formed by, for example, electroplating. The electroplating is, for example, electric Ni plating or electric Sn plating.

Figure 2:
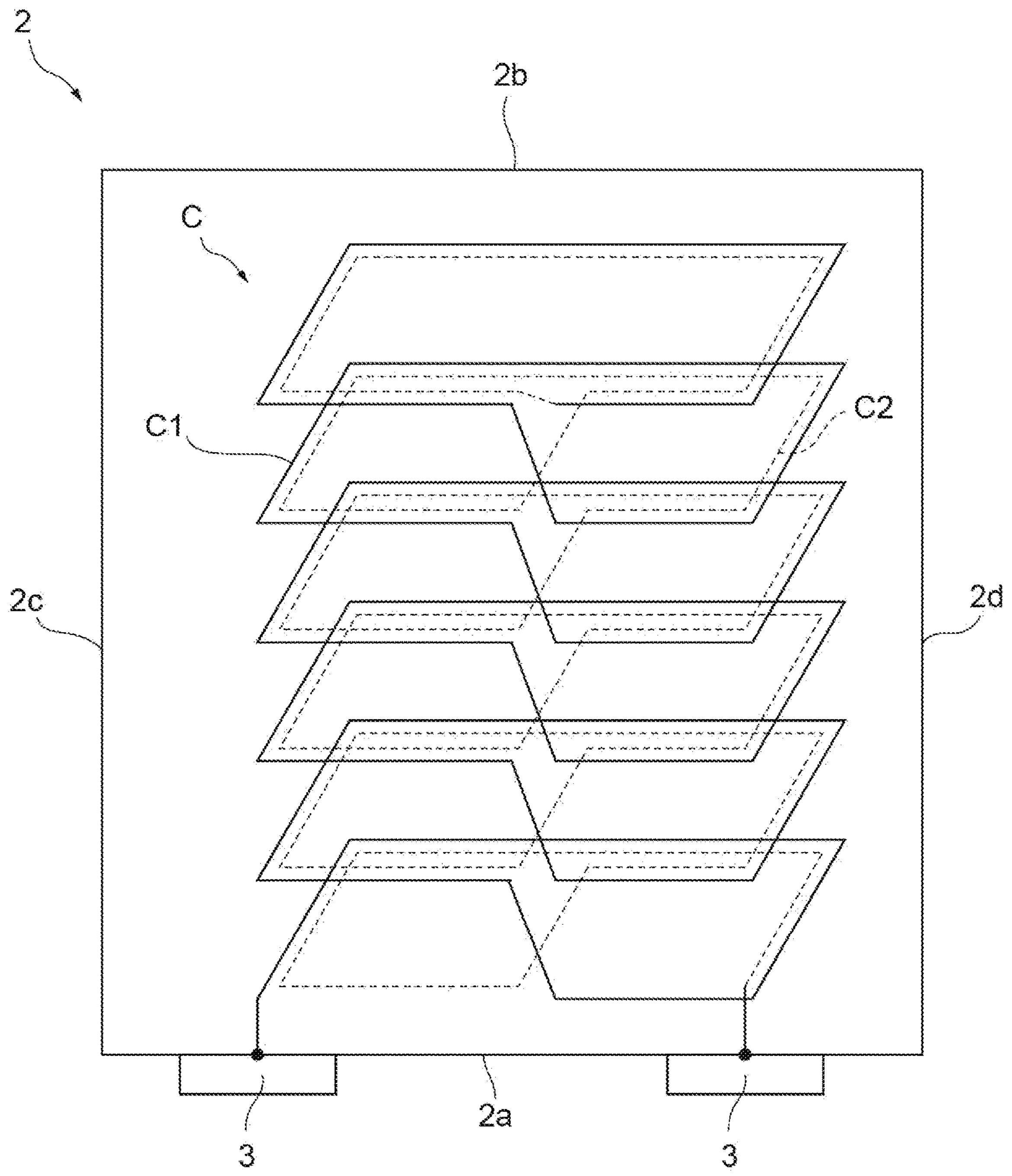
FIG. 2 is a diagram schematically showing a configuration of a coil portion of the laminated coil component shown in FIG. 1.

FIG. 2 is a diagram schematically showing a configuration of the coil portion of the laminated coil component shown in FIG. 1. As shown in the same drawing, a coil portion C is provided inside the element body 2. As shown in FIG. 2, the laminated coil component 1 includes the coil portion C having a double wound structure formed by an outer wound body C1 and an inner wound body C2. The outer wound body C1 and the inner wound body C2 have opposite winding directions. In the example of FIG. 2, the outer wound body C1 is a wound body that is wound from the side of the end surface 2*a* of the element body 2 toward the side of the end surface 2*b* and the inner wound body C2 is a wound body that is wound from the side of the end surface 2*b* of the element body 2 toward the side of the end surface 2*a*. One end of the outer wound body C1 is drawn out to the side of the mounting surface (the end surface 2*a*) of the element body 2 and is connected to one of the pair of terminal electrodes 3 and 3. One end of the inner wound body C2 is drawn out to the side of the mounting surface (the end surface 2*a*) of the element body 2 and is connected to the other of the pair of terminal electrodes 3 and 3. The other end of the outer wound body C1 and the other end of the inner wound body C2 are connected on the side of the opposite surface (the end surface 2*b*) of the mounting surface.

FIG. 3 is a schematic exploded perspective view showing an example of the layer configuration of the laminated coil component shown in FIG. 1. As shown in the same drawing, a plurality of layers constituting the coil portion C include a cover layer Lc, a first conductor pattern layer L1, a second conductor pattern layer L2, a third conductor pattern layer L3, and a fourth conductor pattern layer L4. The cover layer Lc is a layer composed of only the element body portion 11 containing the metal magnetic particles. A plurality of the cover layers Lc are arranged on the side of the end surface 2*b* of the element body 2. Each layer except for the cover layer Lc is configured by hollowing out the element body portion 11 containing the above-described metal magnetic particles in a shape corresponding to the conductor portion and disposing the conductor portion in the hollowed out portion. Therefore, in each of these layers, the element body portion 11 and the conductor portion are flush with each other.

The conductor portion is formed of, for example, a metal material. The material of the metal material is not particularly limited, but for example, Ag, Cu, Au, Al, Pd, Pd/Ag alloy, and the like can be used. A Ti compound, a Zr compound, a Si compound, or the like may be added to the metal material. For example, laser processing can be used for hollowing out the element body portion 11. For example, a printing method or a thin film growth method can be used for forming the conductor portion.

The first conductor pattern layer L1 and the second conductor pattern layer L2 are layers which form the outer wound body C1 and the inner wound body C2 which are main parts of the coil portion C. In this embodiment, first conductor pattern layers L1A and L1B and one second conductor pattern layer L2 are laminated in this order to form one set and a plurality of sets are provided in the laminated structure according to the required number of turns in the coil portion C. In the example of FIG. 3, the first conductor pattern layers L1A and L1B are laminated on the lower layer side (the side of the end surface 2*a* of the element body 2) of the plurality of sets, and a through-hole layer L4*a* and a fourth conductor pattern layer L4 are further laminated on the lower layer side of the first conductor pattern layer LIB.

Figure 4A:
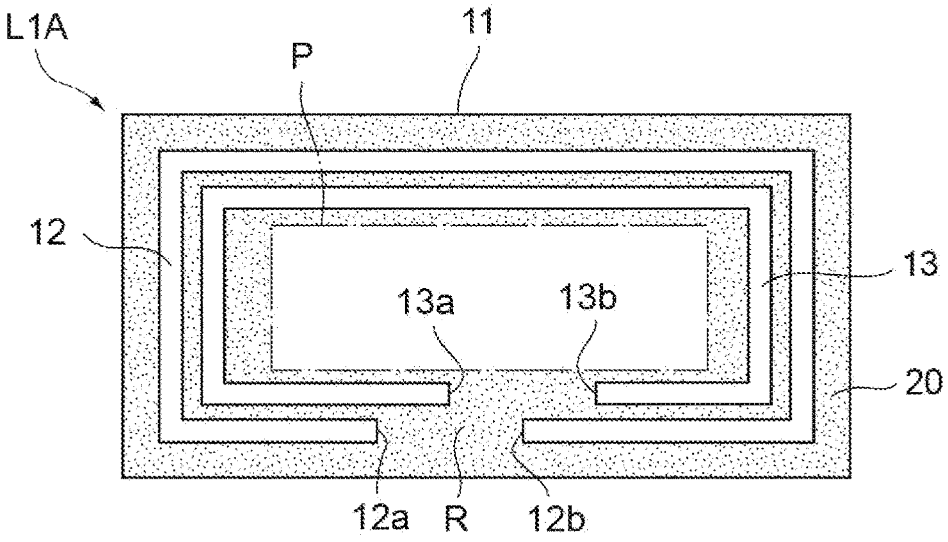
FIG. 4A is a plan view showing a first conductor pattern layer of the laminated coil component shown in FIG. 1.
Figure 4B:
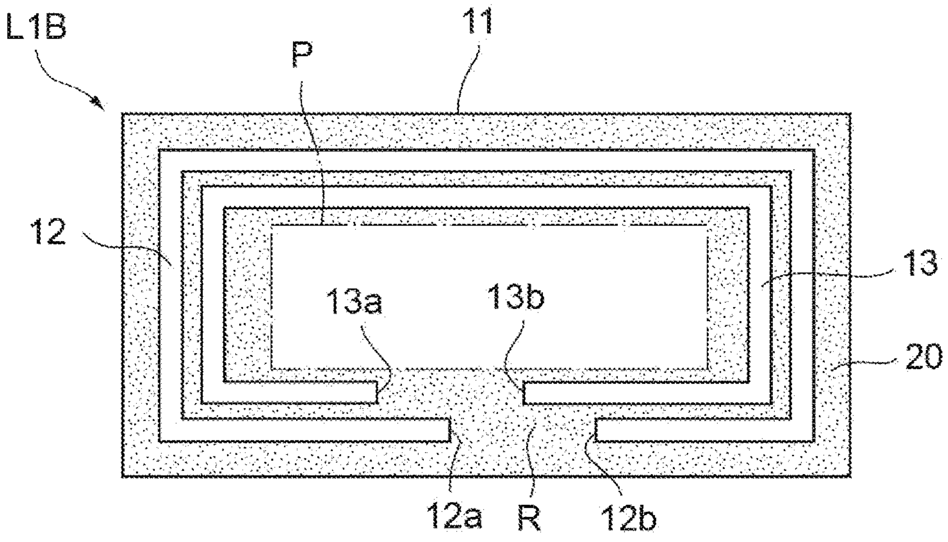
FIG. 4B is a plan view showing the first conductor pattern layer of the laminated coil component shown in FIG. 1.

The first conductor pattern layers L1A and L1B include, as shown in FIGS. 4A and 4B, an outer conductor line 12 and an inner conductor line 13 which have an annular shape. The outer conductor line 12 is disposed in a rectangular annular shape which is one size smaller than the outer shape of the first conductor pattern layer L1 and the inner conductor line 13 is disposed in a rectangular annular shape which is one size smaller than the outer conductor line 12. The width of the outer conductor line 12 is about the same as the width of the inner conductor line 13. The outer conductor line 12 and the inner conductor line 13 are separated from each other by a distance smaller than the width of these lines. By suppressing the gap between the outer conductor line 12 and the inner conductor line 13, the inner diameters of the outer wound body C1 and the inner wound body C2 are sufficiently ensured.

The outer conductor line 12 and the inner conductor line 13 are partially divided in a predetermined division region R. The division region R is, for example, ¼ or less of the length of one turn of the outer conductor line 12 and the inner conductor line 13 and has a substantially C shape in a plan view. In the examples of FIGS. 4A and 4B, the division region is located at a position close to one long side surface (the end surface on the front side of the paper surface of FIG. 1) in a plan view of the first conductor pattern layer L1. The outer conductor line 12 includes a pair of end portions 12*a* and 12*b* which face each other with the division region R interposed therebetween. Similarly, the inner conductor line 13 includes a pair of end portions 13*a* and 13*b* which face each other with the division region R interposed therebetween. In all of the first conductor pattern layers L1A and L1B, the gap between the pair of end portions 12*a* and 12*b* and the gap between the pair of end portions 12*a* and 12*b* are the same as each other.

On the other hand, the positions of the pair of end portions 12*a* and 12*b* of the outer conductor line 12 and the positions of the pair of end portions 13*a* and 13*b* of the inner conductor line 13 are displaced from each other in the line direction of the coil portion C passing through the division region R (here, the facing direction of the end surfaces 2*c* and 2*d* of the element body 2) in the plane of the same layer. In the first conductor pattern layer L1A, the positions of the pair of end portions 12*a* and 12*b* are unevenly distributed on the side of the end surface 2*c* of the element body 2 in relation to the center and the positions of the pair of end portions 13*a* and 13*b* are unevenly distributed on the side of the end surface 2*d* of the element body 2 in relation to the center (see FIG. 4A). In the first conductor pattern layer L1B, the positions of the pair of end portions 12*a* and 12*b* are unevenly distributed on the side of the end surface 2*d* of the element body 2 in relation to the center and the positions of the pair of end portions 13*a* and 13*b* are unevenly distributed on the side of the end surface 2*c* of the element body 2 in relation to the center (see FIG. 4B).

Figure 4C:
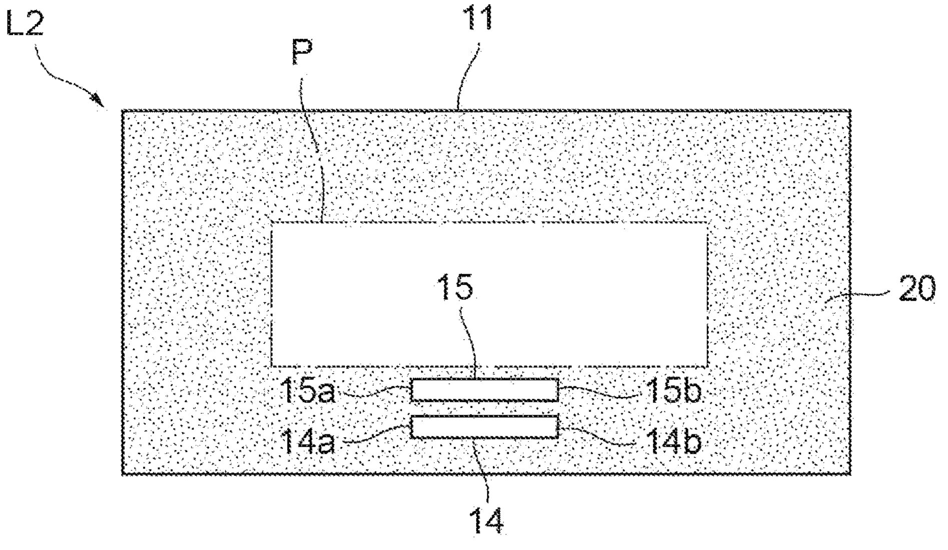
FIG. 4C is a plan view showing a second conductor pattern layer of the laminated coil component shown in FIG. 1.

The second conductor pattern layer L2 is a layer which connects the outer conductor lines 12 and 12 and the inner conductor lines 13 and 13 of the first conductor pattern layers L1 adjacent to each other in the laminating direction. The second conductor pattern layer L2 includes, as shown in FIG. 4C, an outer connection line 14 and an inner connection line 15. Both the outer connection line 14 and the inner connection line 15 are formed in a linear shape and are arranged to correspond to the division region R. In the example of FIG. 4C, the positions of both end portions 14*a* and 14*b* of the outer connection line 14 and the positions of both end portions 15*a* and 15*b* of the inner connection line 15 are aligned with respect to the line direction of the coil portion C passing through the division region R.

The length of the outer connection line 14 is larger than the gap between the end portion 12*a* of the outer conductor line 12 of the first conductor pattern layer L1A and the end portion 12*b* of the outer conductor line 12 of the second conductor pattern layer L2B in a plan view. Further, the length of the inner connection line 15 is larger than the gap between the end portion 13*a* of the inner conductor line 13 of the first conductor pattern layer L1A and the end portion 13*b* of the inner conductor line 13 of the second conductor pattern layer L2B in a plan view.

Figure 5A:
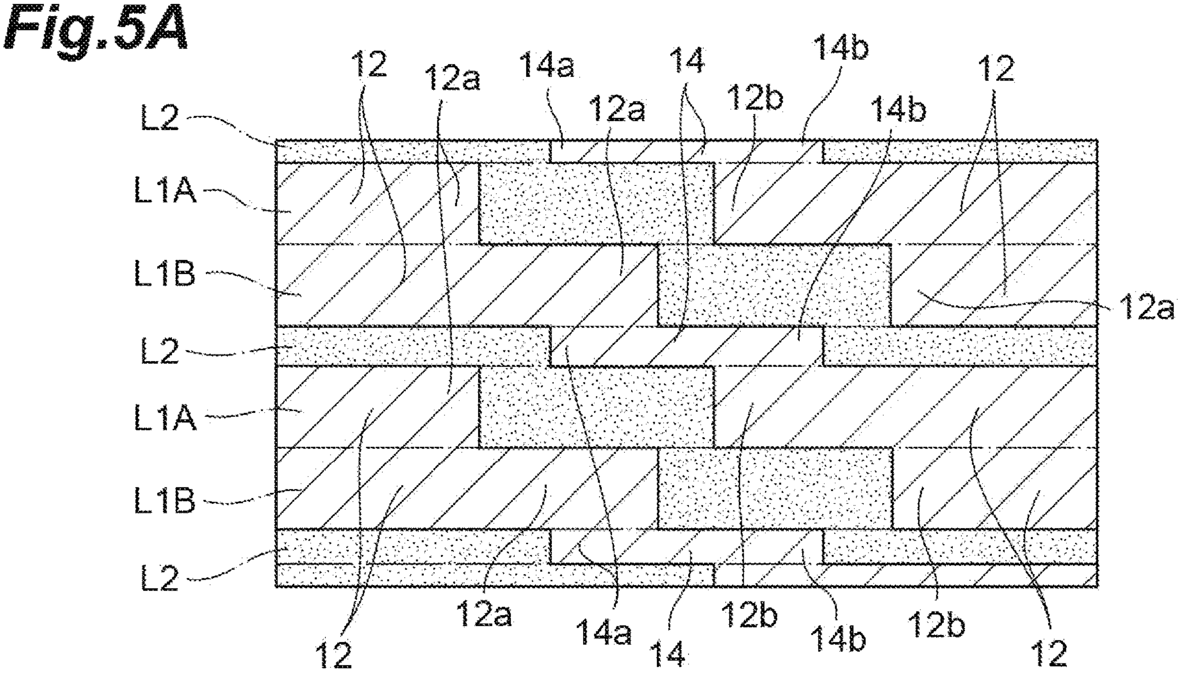
FIG. 5A is a schematic partially enlarged cross-sectional view showing a configuration of an outer wound body in the vicinity of a division region of the laminated coil component shown in FIG. 1.

In the laminated state of the first conductor pattern layer L1A, the first conductor pattern layer L1B, and the second conductor pattern layer L2, as shown in FIG. 5A, the outer conductor lines 12 and 12 of one set of the first conductor pattern layer L1A and the second conductor pattern layer L2B overlap each other in the laminating direction. Then, the end portion 14*a* of the outer connection line 14 overlaps the end portions 12*a* of the outer conductor lines 12 of one set of the first conductor pattern layers L1A and the end portion 14*b* of the outer connection line 14 overlaps the end portions 12*b* of the outer conductor lines 12 of the first conductor pattern layers L1B of the set adjacent to one set in the laminating direction. Accordingly, one set of the outer conductor lines 12 and 12 and the other set of the outer conductor lines 12 and 12 are connected in a stepped manner by the outer connection line 14 and the outer wound body C1 which is wound from the side of the end surface 2*a* toward the side of the end surface 2*b* of the element body 2 is formed.

Figure 5B:
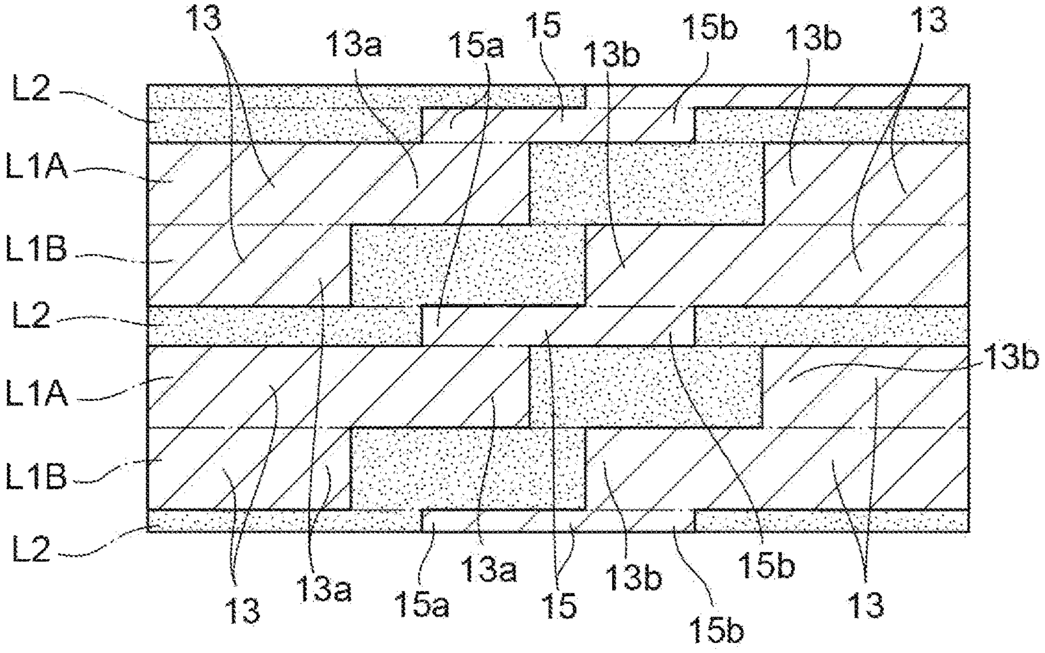
FIG. 5B is a schematic partially enlarged cross-sectional view showing a configuration of an inner wound body in the vicinity of the division region of the laminated coil component shown in FIG. 1.

Further, in the laminated state of the first conductor pattern layer L1A, the first conductor pattern layer L1B, and the second conductor pattern layer L2, as shown in FIG. 5B, the inner conductor lines 13 and 13 of one set of the first conductor pattern layer L1A and the second conductor pattern layer L2B overlap each other in the laminating direction. Then, the end portion 15*a* of the inner connection line 15 overlaps the end portions 13*a* of the inner conductor lines 13 of one set of the first conductor pattern layers L1A and the end portion 15*b* of the inner connection line 15 overlaps the end portions 13*b* of the inner conductor lines 13 of the first conductor pattern layers L1B of the set adjacent to one set in the laminating direction. Accordingly, one set of the inner conductor lines 13 and 13 and the other set of the inner conductor lines 13 and 13 are connected in a stepped manner by the inner connection line 15 and the inner wound body C2 which is wound from the side of the end surface 2*b* toward the side of the end surface 2*c* of the element body 2 is formed.

Additionally, as shown in FIGS. 5A and 5B, the thickness of the second conductor pattern layer L2 is smaller than the thickness of the first conductor pattern layers L1A and L1B. The ratio of the thickness of the second conductor pattern layer L2 with respect to the thickness of the first conductor pattern layers L1A and L1B is not particularly limited, but can be, for example, ½ or less. The thickness of the first conductor pattern layer L1A and the thickness of the first conductor pattern layer L1B may be the same as each other or different from each other.

The third conductor pattern layer L3 is a layer which connects the outer wound body C1 and the inner wound body C2. The third conductor pattern layer L3 includes, as shown in FIG. 3, a connection line 16 which connects the outer conductor line 12 and the inner conductor line 13. In the example of FIG. 3, the third conductor pattern layer L3 is laminated between the cover layer Lc and the first conductor pattern layer L1A of the set located closest to the end surface 2*b* of the element body 2. The connection line 16 extends diagonally at a position corresponding to the division region R and connects the end portion 15*a* of the inner connection line 15 and the end portion 14*b* of the outer connection line 14 in the first conductor pattern layer L1A of the set located closest to the end surface 2*b* of the element body 2.

The fourth conductor pattern layer L4 is a layer which connects the coil portion C and the terminal electrodes 3 and 3. As shown in FIG. 3, the fourth conductor pattern layer L4 is laminated at a position closest to the end surface 2*a* of the element body 2 through the through-hole layer L4*a* having the through-holes 17A and 17B. The fourth conductor pattern layer L4 includes a pair of lead conductors 18A and 18B. In the example of FIG. 3, both lead conductors 18A and 18B have a rectangular shape in a plan view. The lead conductor 18A is disposed on the side of the end surface 2*c* of the element body 2 and is connected to one terminal electrode 3. The lead conductor 18A is connected to the outer conductor line 12 of the first conductor pattern layer L1B located at a position closest to the end surface 2*a* of the element body 2 through the through-hole 17A. The lead conductor 18B is disposed on the side of the end surface 2*d* of the element body 2 and is connected to the other terminal electrode 3. The lead conductor 18B is connected to the inner conductor line 13 of the first conductor pattern layer L1B located at a position closest to the end surface 2*a* of the element body 2 through the through-hole 17B.

In this embodiment, in each of the above-described layers, a part of the element body portion 11 is provided with a high resistivity region 20 having a higher resistivity than the other regions. The resistivity here indicates an electrical resistivity. The resistivity in the element body portion 11 can be adjusted, for example, by adjusting the particle size of the metal magnetic particles contained in the element body 2. For example, when the average particle size of the metal magnetic particles is made smaller than the average particle size of the metal magnetic particles in other regions, the high resistivity region 20 can be disposed in a desired region.

In the first conductor pattern layer L1, the resistivity of the region between the outer conductor line 12 and the inner conductor line 13 is higher than the resistivity of the center region P of the first conductor pattern layer L1. Here, the center region P is a rectangular region which is located on the inside of the inner conductor line 13 and is one size smaller than the inner conductor line 13. In the example of FIG. 3, in any of the first conductor pattern layers L1A and L1B, the high resistivity region 20 is disposed to surround the outer conductor line 12 and the inner conductor line 13 except for the center region P. Accordingly, a region on the outside of the outer conductor line 12, a region between the outer conductor line 12 and the inner conductor line 13, and a region between the inner conductor line 13 and the center region P become the high resistivity region 20 together with the division region R.

In the second conductor pattern layer L2, the high resistivity region 20 is disposed in the entire portion excluding the center region P. The high resistivity region 20 of the second conductor pattern layer L2 overlaps the high resistivity region 20 of the first conductor pattern layer L1 in a plan view and the periphery of the outer connection line 14 and the inner connection line 15 located in the division region R also becomes the high resistivity region 20. Further, the high resistivity region 20 of the second conductor pattern layer L2 is also disposed between the outer conductor lines 12 and 12 and between the inner conductor lines 13 and 13 of the first conductor pattern layers L1 adjacent to each other in the laminating direction (see FIGS. 5A and 5B).

As described above, in the laminated coil component 1, the outer conductor lines 12 and 12 and the inner conductor lines 13 and 13 of the first conductor pattern layers L1 adjacent to each other in the laminating direction are connected to each other so that the coil portion C of the multiple wound structure is formed inside the element body 2. By adopting the coil portion C having such a multiple wound structure, the winding efficiency can be improved. In the laminated coil component 1, the outer conductor lines 12 and 12 and the inner conductor lines 13 and 13 are connected in a stepped manner by the outer connection line 14 and the inner connection line 15 located in the division region R of the outer conductor line 12 and the inner conductor line 13. Therefore, since it is possible to sufficiently ensure the inner diameter of the coil portion C, it is possible to improve the characteristics such as the inductance value, the DC superimposition characteristic, and the DC resistance. Further, in the laminated coil component 1, it is possible to suppress the types of conductor patterns required for forming the coil portion C and it is possible to avoid taking time and effort to produce each layer.

Further, in the laminated coil component 1, the positions of both end portions 14*a* and 14*b* of the outer connection line 14 and both end portions 15*a* and 15*b* of the inner connection line 15 in the division region R are aligned with respect to the line direction of the coil portion passing through the division region and the positions of the pair of end portions 12*a* and 12*b* of the outer conductor line 12 and the pair of end portions 13*a* and 13*b* of the inner conductor line 13 facing each other with the division region R interposed therebetween are displaced in the line direction of the coil portion C passing through the division region R. Accordingly, it is possible to suppress the length of the region in which the outer conductor line 12 and the inner conductor line 13 are parallel to each other. The region in which the outer conductor line 12 and the inner conductor line 13 are parallel to each other is more likely to receive a voltage than other parts. Thus, it is possible to appropriately improve the withstand voltage by suppressing the length of the region.

In the laminated coil component 1, the resistivity of the region between the outer conductor line 12 and the inner conductor line 13 in the first conductor pattern layer L1 may be higher than the resistivity of the center region P of the first conductor pattern layer L1. The region between the outer conductor line 12 and the inner conductor line 13 is more likely to receive a voltage than other parts. Thus, it is possible to further improve the withstand voltage by relatively increasing the resistivity of the corresponding region.

In the laminated coil component 1, the resistivity of the region between the outer conductor lines 12 and 12 and between the inner conductor lines 13 and 13 of the first conductor pattern layers L1 adjacent to each other in the laminating direction in the second conductor pattern layer L2 is higher than the resistivity of the center region P of the second conductor pattern layer L2. The region between the outer conductor lines 12 and 12 and the inner conductor lines 13 and 13 of the first conductor pattern layers L1 adjacent to each other in the laminating direction is more likely to receive a voltage than other parts. Thus, it is possible to further improve the withstand voltage by relatively increasing the resistivity of the corresponding region.

In the laminated coil component 1, the thickness of the second conductor pattern layer L2 is smaller than the thickness of the first conductor pattern layer L1. Accordingly, it is possible to reduce the thickness of the connection portion of the outer conductor line 12 and the inner conductor line 13 (in the examples of FIGS. 5A and 5B, the thickness of the overlapping portion between the end portions 12*a* and 12*b* of the outer conductor line 12 and the end portions 14*a* and 14*b* of the outer connection line 14 and the thickness of the overlapping portion between the end portions 13*a* and 13*b* of the inner conductor line 13 and the end portions 15*a* and 15*b* of the inner connection line 15) and to more closely wind the coil portion C in the laminating direction. Further, it is possible to suppress the heat shrinkage of the connection portion and a variation in thickness due to the heat shrinkage by suppressing the thickness of the connection portion. Thus, it is possible to suppress the occurrence of disconnection in the connection portion.

In the laminated coil component 1, the pair of terminal electrodes 3 and 3 are provided in the end surface 2*a* of the element body 2 in the laminating direction. Further, the coil portion C includes the fourth conductor pattern layer L4 having the lead conductors 18A and 18B connecting the outer conductor line 12 to one of the pair of terminal electrodes 3 and 3 and connecting the inner conductor line 13 to the other of the pair of terminal electrodes 3 and 3. Accordingly, a so-called bottom terminal type laminated coil component can be configured. In the bottom terminal type laminated coil component, the mounting area can be reduced and the high-density mounting can be realized.

In the laminated coil component 1, the third conductor pattern layer L3 connects the outer conductor line 12 and the inner conductor line 13 on the side of the end surface 2*b* of the element body 2 in the laminating direction. Accordingly, the number of turns of the coil portion C can be sufficiently ensured.

The present disclosure is not limited to the above-described embodiment. For example, as shown in FIG. 6, the positions of the pair of end portions 12*a* and 12*b* of the outer conductor line 12 and the pair of end portions 13*a* and 13*b* of the inner conductor line 13 facing each other with the division region R interposed therebetween may be aligned in the line direction of the coil portion C passing through the division region R and the positions of both end portions 14*a* and 14*b* of the outer connection line 14 and both end portions 15*a* and 15*b* of the inner connection line 15 in the division region R may be displaced in the line direction of the coil portion C passing through the division region R.

Figure 6:
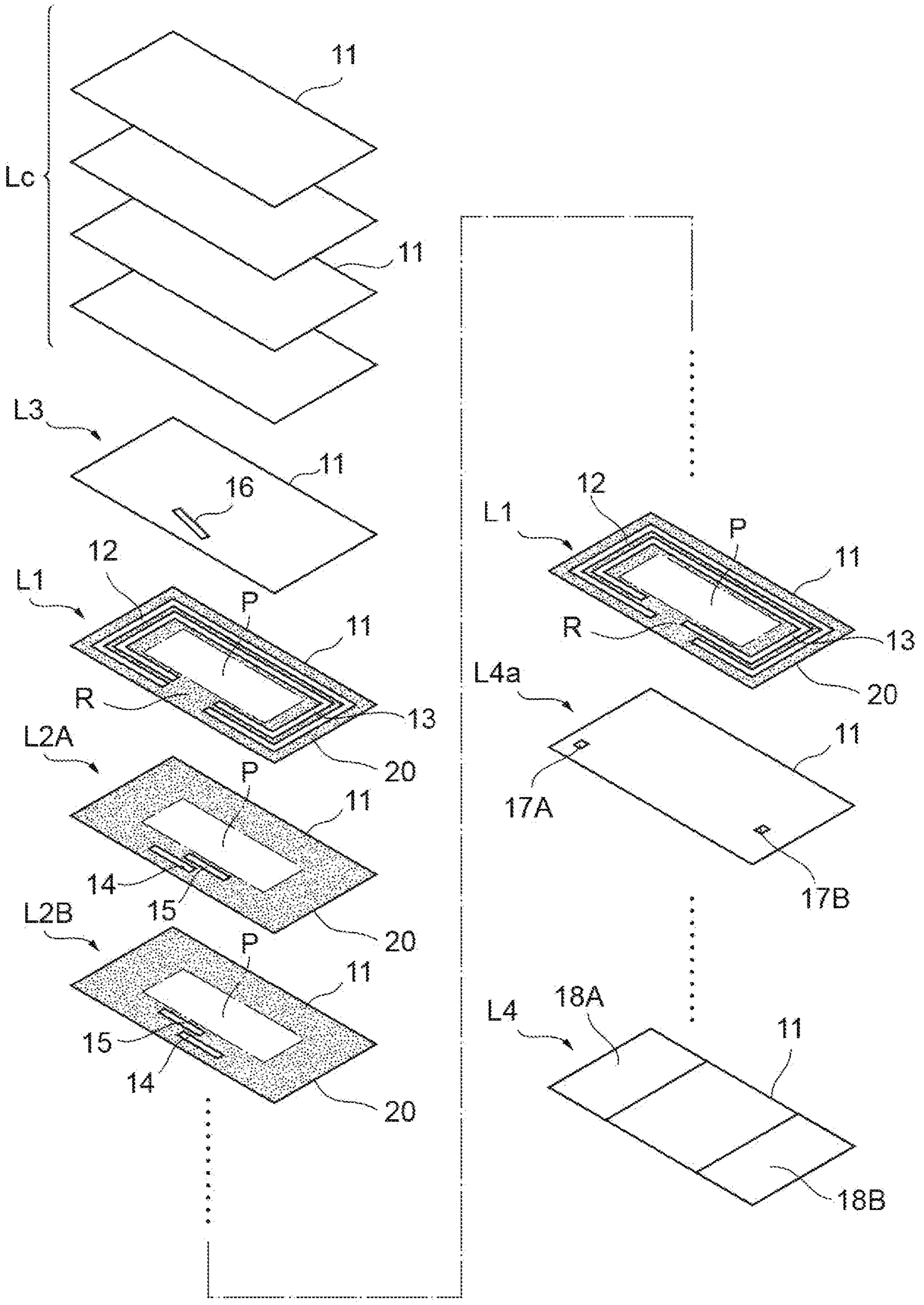
FIG. 6 is a schematic exploded perspective view showing another example of the layer configuration of the laminated coil component shown in FIG. 1.

In the example of FIG. 6, one first conductor pattern layer L1 and a pair of second conductor pattern layers L2A and L2B are laminated in this order to form a set and a plurality of sets are formed inside the laminated structure according to the required number of turns in the coil portion C. In the first conductor pattern layer L1, as shown in FIG. 7A, all positions of the pair of end portions 12*a* and 12*b* of the outer conductor line 12 and the positions of the pair of end portions 13*a* and 13*b* of the inner conductor line 13 are symmetrical with the center interposed therebetween.

Figure 7A:
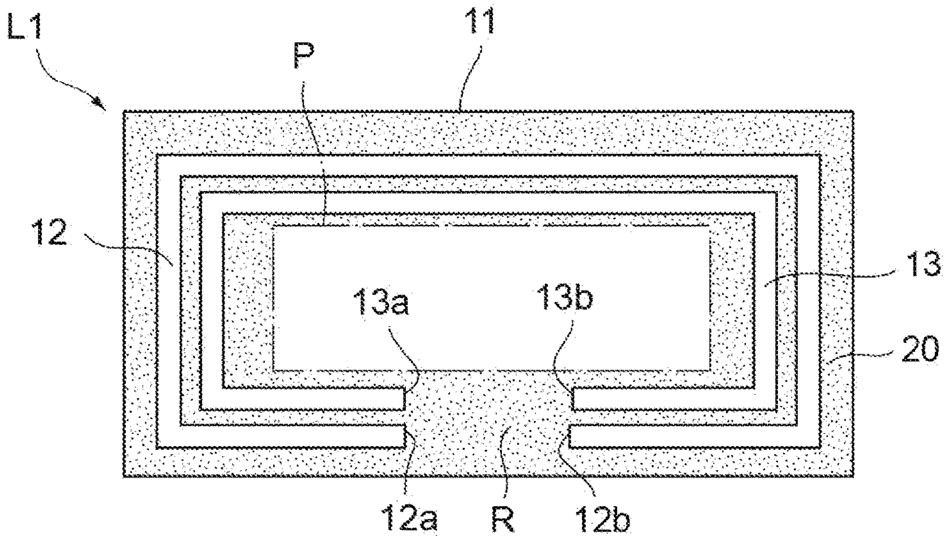
FIG. 7A is a plan view showing a first conductor pattern layer of the laminated coil component shown in FIG. 6.
Figure 7B:
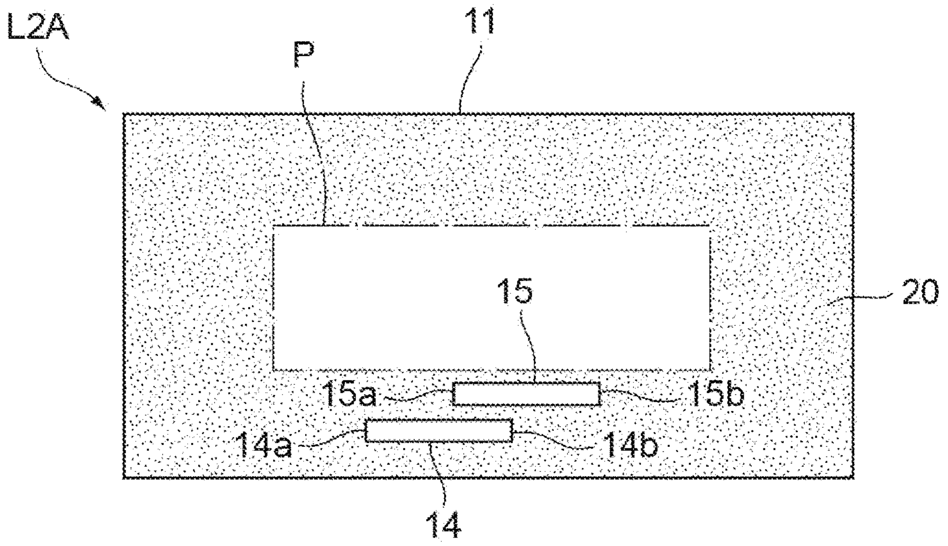
FIG. 7B is a plan view showing the first conductor pattern layer of the laminated coil component shown in FIG. 6.
Figure 7C:
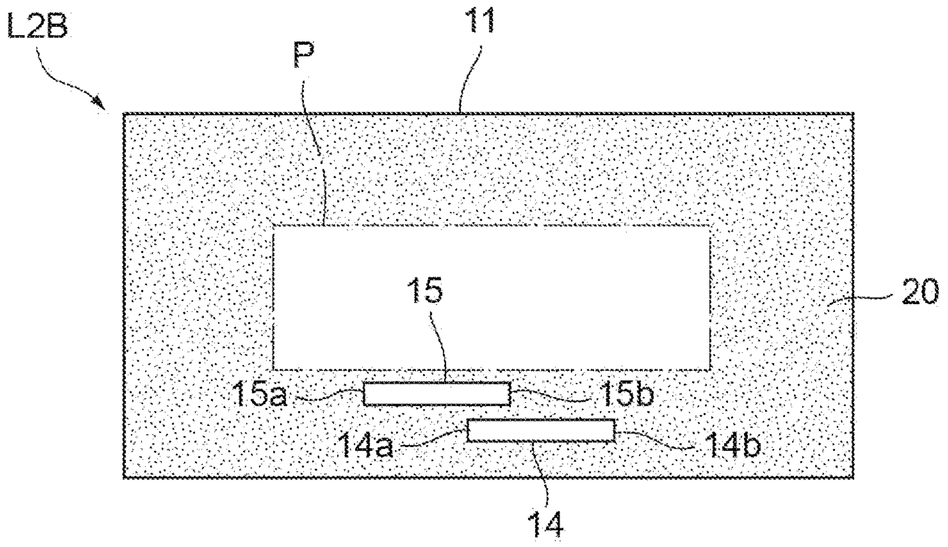
FIG. 7C is a plan view showing a second conductor pattern layer of the laminated coil component shown in FIG. 6.

On the other hand, as shown in FIGS. 7A and 7B, the outer connection line 14 and the inner connection line 15 of the second conductor pattern layer L2A and the outer connection line 14 and the inner connection line 15 of the second conductor pattern layer L2B are arranged alternately in a plan view. That is, in the second conductor pattern layer L2A, the outer connection line 14 is unevenly distributed on the side of the end surface 2*c* of the element body 2 in relation to the center and the inner connection line 15 is unevenly distributed on the side of the end surface 2*d* of the element body 2 in relation to the center. Further, in the second conductor pattern layer L2B, the outer connection line 14 is unevenly distributed on the side of the end surface 2*d* of the element body 2 in relation to the center and the inner connection line 15 is unevenly distributed on the side of the end surface 2*c* of the element body 2 in relation to the center.

Figure 8A:
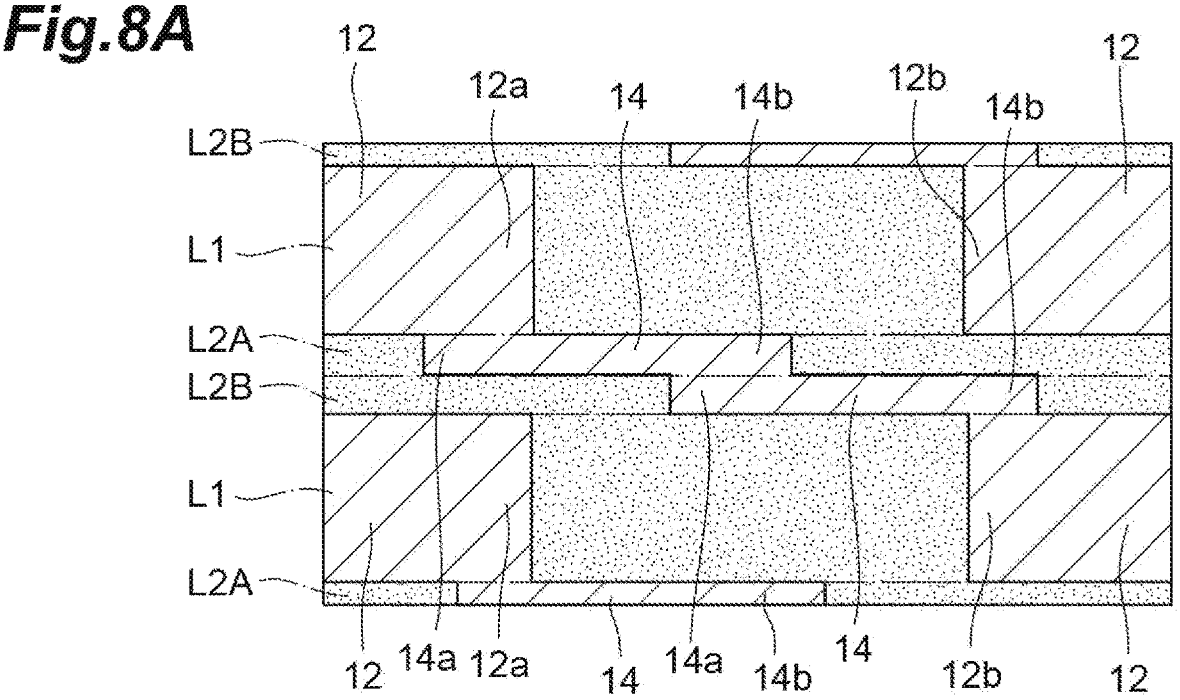
FIG. 8A is a schematic partially enlarged cross-sectional view showing a configuration of an outer wound body in the vicinity of a division region of the laminated coil component shown in FIG. 6.

In the laminated state of the first conductor pattern layer L1 and the second conductor pattern layers L2A and L2B, as shown in FIG. 8A, the end portion 14*b* of the outer connection line 14 of the second conductor pattern layer L2A and the end portion 14*a* of the outer connection line 14 of the second conductor pattern layer L2B overlap each other in the laminating direction. Then, the end portion 14*a* of the outer connection line 14 of the second conductor pattern layer L2A overlaps the end portions 12*a* of the outer conductor lines 12 of one set of the first conductor pattern layers L1 and the end portion 14*b* of the outer connection line 14 of the second conductor pattern layer L2B overlaps the end portions 12*b* of the outer conductor lines 12 of the first conductor pattern layers L1 of the set adjacent to one set in the laminating direction.

Figure 8B:
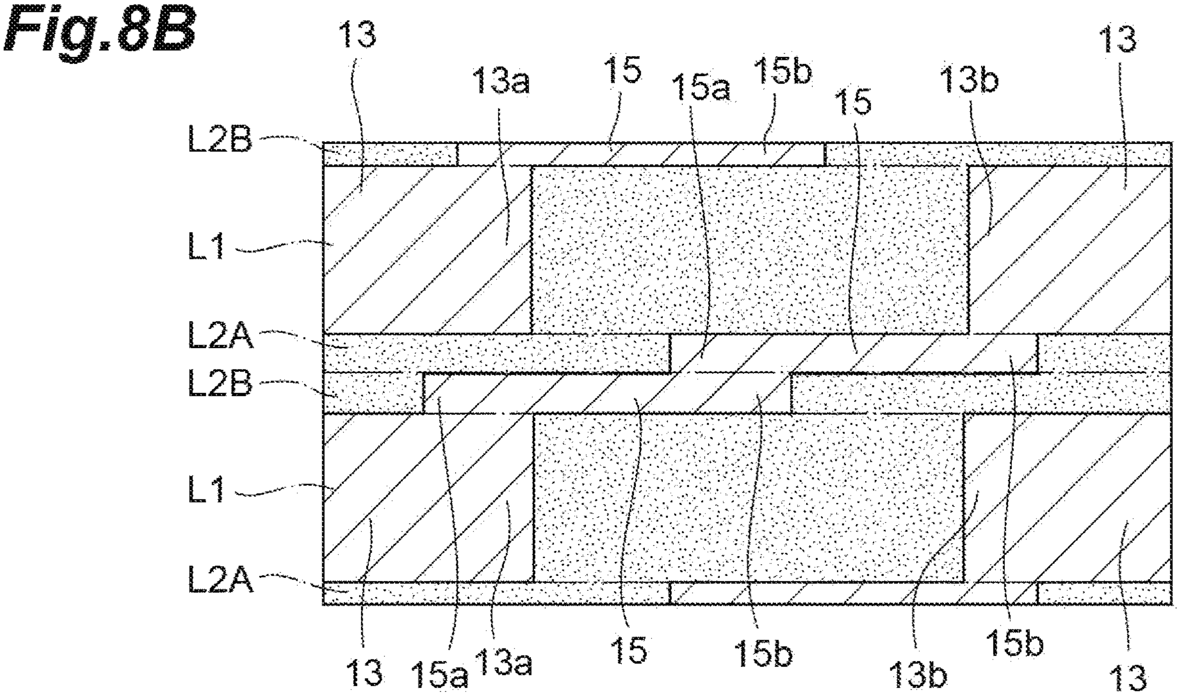
FIG. 8B is a schematic partially enlarged cross-sectional view showing a configuration of an inner wound body in the vicinity of the division region of the laminated coil component shown in FIG. 6.

Further, in the laminated state of the first conductor pattern layer L1 and the second conductor pattern layers L2A and L2B, as shown in FIG. 8B, the end portion 15*a* of the inner connection line 15 of the second conductor pattern layer L2A and the end portion 15*b* of the inner connection line 15 of the second conductor pattern layer L2B overlap each other in the laminating direction. Then, the end portion 15*b* of the inner connection line 15 of the second conductor pattern layer L2A overlaps the end portions 13*b* of the inner conductor lines 13 of one set of the first conductor pattern layers L1 and the end portion 15*a* of the inner connection line 15 of the second conductor pattern layer L2B overlaps the end portions 13*a* of the inner conductor lines 13 of the first conductor pattern layers L1 of the set adjacent to one set in the laminating direction.

Figure 9:
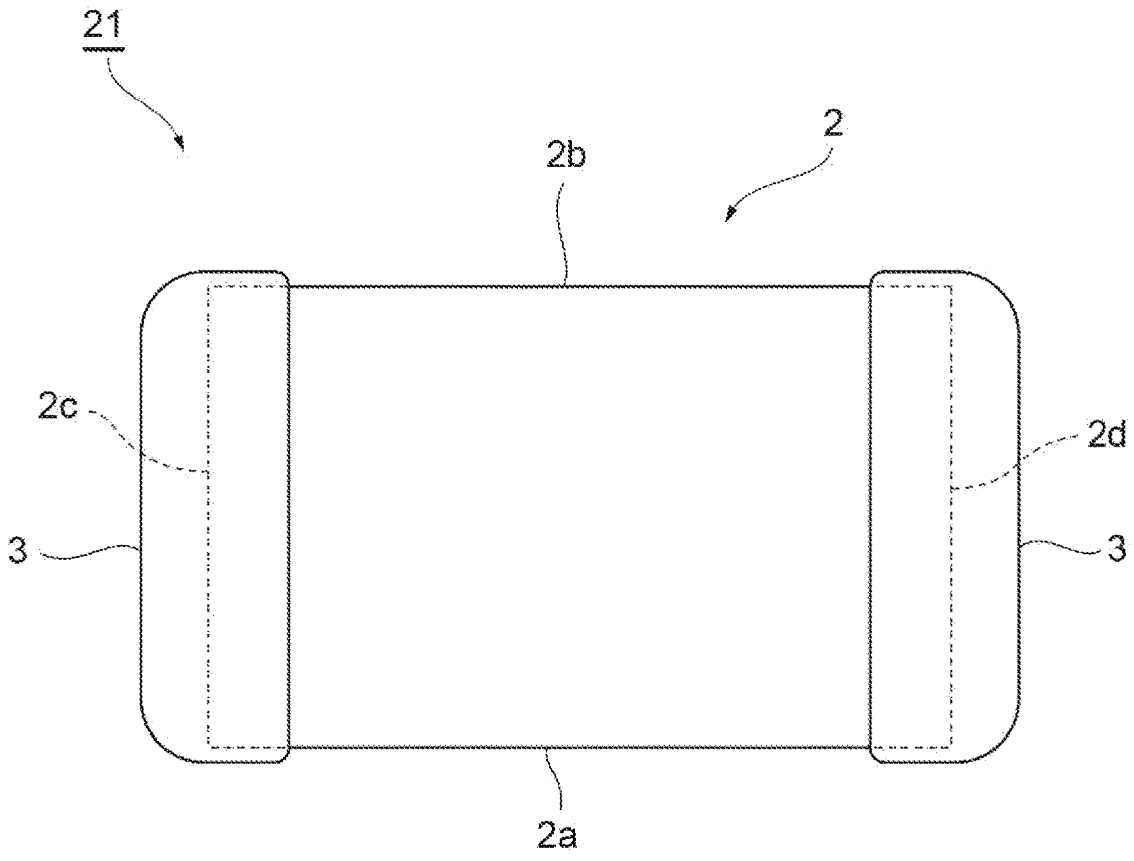
FIG. 9 is a schematic side view showing a laminated coil component according to another modified example.
Figure 10:
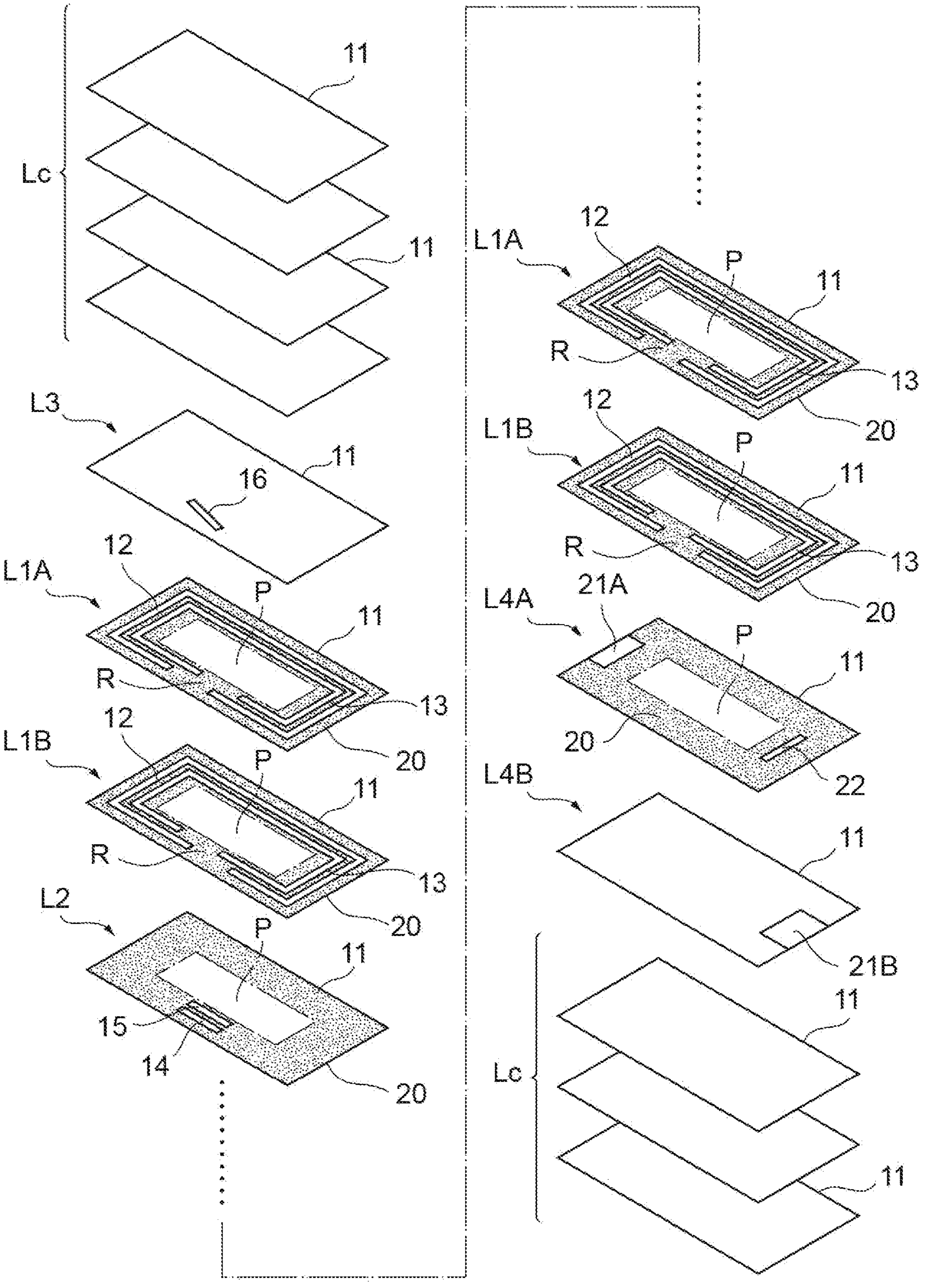
FIG. 10 is a schematic exploded perspective view showing an example of the layer configuration of the laminated coil component shown in FIG. 1.

In the above-described embodiment, the bottom terminal type laminated coil component 1 in which the pair of terminal electrodes 3 and 3 are provided on the end surface 2*a* of the element body 2 in the laminating direction has been illustrated, but as shown in FIG. 9, an end surface terminal type laminated coil component 21 in which the terminal electrode 3 is provided on each of both end surfaces 2*c* and 2*d* of the element body 2 in the longitudinal direction may be adopted. When the layer configuration shown in FIG. 3 is applied to the end surface terminal type, for example, as shown in FIG. 10, the plurality of cover layers Lc and a pair of fourth conductor pattern layers L4A and L4B may be laminated on the lower layer side of the first conductor pattern layers L1A and L1B on the lower layer side (the side of the end surface 2*a* of the element body 2) of the plurality of sets instead of the fourth conductor pattern layer L4 and the through-hole layer L4*a* including the through-holes 17A and 17B.

The fourth conductor pattern layer L4A includes a lead conductor 21A and a through-hole 22. The lead conductor 21A is formed in a rectangular shape in a plan view and is disposed on the side of the end surface 2*c* of the element body 2. The lead conductor 21A connects the outer conductor line 12 of the first conductor pattern layer L1B located at a position closest to the end surface 2*a* of the element body 2 to one terminal electrode 3 provided on the side of the end surface 2*c*. The through-hole 22 is disposed on the side of the end surface 2*d* of the element body 2 to be separated from the lead conductor 21A and is connected to the inner conductor line 13 of the first conductor pattern layer L1B located at a position closest to the end surface 2*a* of the element body 2. Additionally, in the example of FIG. 10, the element body portion 11 of the fourth conductor pattern layer L4A becomes the high resistivity region 20 except for the center region P. Accordingly, both the lead conductor 21A and the through-hole 22 are surrounded by the high resistivity region 20.

The fourth conductor pattern layer L4B includes a lead conductor 21B. The lead conductor 21B is formed in a rectangular shape in a plan view and is disposed on the side of the end surface 2*d* of the element body 2. The lead conductor 21B connects the inner conductor line 13 of the first conductor pattern layer L1B located at a position closest to the end surface 2*a* of the element body 2 to the other terminal electrode 3 provided on the side of the end surface 2*d* through the through-hole 22 of the fourth conductor pattern layer L4A.

Figure 11:
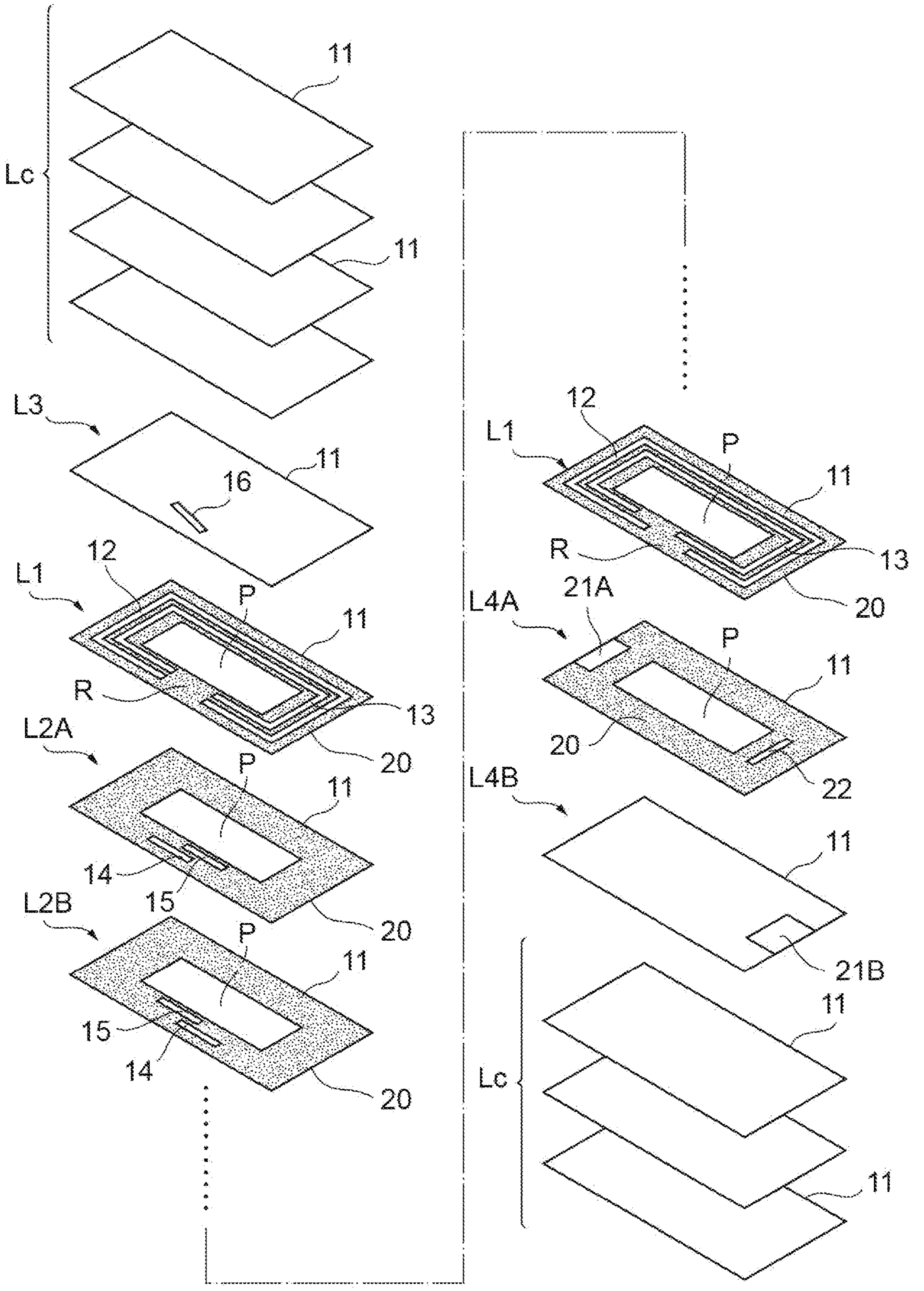
FIG. 11 is a schematic exploded perspective view showing another example of the layer configuration of the laminated coil component shown in FIG. 1.

The same applies to a case in which the layer configuration of FIG. 6 is applied to the end surface terminal type. For example, as shown in FIG. 11, the plurality of cover layers Lc and a pair of fourth conductor pattern layers L4A and 4B shown in FIG. 10 may be laminated on the lower layer side of the first conductor pattern layer L1 on the lower layer side (the side of the end surface 2*a* of the element body 2) of the plurality of sets instead of the fourth conductor pattern layer L4 and the layer L4*a* including the through-holes 17A and 17B.

The high resistivity region 20 may not be essentially disposed. That is, the resistivity of the element body portion 11 constituting each layer may be constant. In this case, the configuration can be simplified.

What is claimed is:

1. A laminated coil component including a coil portion formed inside an insulating element body forming a laminated structure, the coil portion including:

- a first conductor pattern layer having a predetermined division region, an annular outer conductor line and an annular inner conductor line, the division region being a region that commonly divides the outer conductor line and the inner conductor line, the outer conductor line and the inner conductor line being partially divided in the division region,
- a second conductor pattern layer adjacent to the first conductor pattern layer in a laminating direction, the second conductor pattern layer having an outer connection line connecting a pair of end portions of the outer conductor line of the first conductor pattern layer in the division region and an inner connection line connecting a pair of end portions of the inner conductor line of the first conductor pattern layer in the division region, and a third conductor pattern layer having a connection line connecting the outer conductor line and the inner conductor line, wherein positions of the pair of end portions of the outer conductor line and the pair of end portions of the inner conductor line facing each other with the division region interposed therebetween or positions of both end portions of the outer connection line and both end portions of the inner conductor line in the division region are displaced in a line direction of the coil portion passing through the division region.

2. The laminated coil component according to claim 1, wherein positions of both end portions of the outer connection line and both end portions of the inner connection line in the division region are aligned with respect to a line direction of the coil portion passing through the division region, and wherein positions of the pair of end portions of the outer conductor line and the pair of end portions of the inner conductor line facing each other with the division region interposed therebetween are displaced in a line direction of the coil portion passing through the division region.

3. The laminated coil component according to claim 1, wherein in the first conductor pattern layer, a resistivity of a region between the outer conductor line and the inner conductor line is higher than a resistivity of a center region of the first conductor pattern layer.

4. The laminated coil component according to claim 1, wherein in the second conductor pattern layer, a resistivity of a region between the outer conductor lines and the inner conductor lines of the first conductor pattern layers adjacent to each other in the laminating direction is higher than a resistivity of a center region of the second conductor pattern layer.

5. The laminated coil component according to claim 1, wherein a thickness of the second conductor pattern layer is smaller than a thickness of the first conductor pattern layer.

6. The laminated coil component according to claim 1, wherein a pair of terminal electrodes are provided on one end surface of the element body in the laminating direction, and wherein the coil portion includes a fourth conductor pattern layer between the second conductor pattern layer and the one end surface in the laminating direction, the fourth conductor pattern layer having a lead conductor connecting the outer conductor line to one of the pair of terminal electrodes and connecting the inner conductor line to the other of the pair of terminal electrodes.

7. The laminated coil component according to claim 6, wherein the third conductor pattern layer connects the outer conductor line and the inner conductor line on the other end surface side of the element body in the laminating direction.

8. The laminated coil component according to claim 1, wherein the division region has a dimension equal to or less than ¼ of a length of one turn of the outer conductor line, and the division region has not conductor formed thereon.

* * * * *